United States Patent [19]

Jackson

[11] 4,014,404

[45] Mar. 29, 1977

[54] SAW HORSE

[75] Inventor: Edgar D. Jackson, Alta Loma, Calif.

[73] Assignee: Steel Web Corporation, Alta Loma, Calif.

[22] Filed: Sept. 10, 1975

[21] Appl. No.: 612,044

[52] U.S. Cl. .................................. 182/155; 182/181

[51] Int. Cl.[2] .......................................... F16M 11/00

[58] Field of Search .......... 182/153, 155, 184, 181, 182/182, 183, 185, 186, 224, 225, 226

[56] References Cited

UNITED STATES PATENTS

| | | | |
|---|---|---|---|
| 403,636 | 5/1889 | Bitterly | 182/155 |
| 615,364 | 12/1898 | Porten | 182/153 |
| 906,076 | 12/1908 | Smyth | 182/184 |
| 1,143,397 | 6/1915 | Horn | 182/153 |
| 2,198,956 | 4/1940 | Thielepape | 182/181 |
| 2,505,532 | 4/1950 | Ernst | 182/181 |
| 3,008,535 | 11/1961 | Vries | 182/151 |
| 3,058,542 | 10/1962 | Rogalla | 182/155 |
| 3,613,831 | 10/1971 | Estep | 182/181 |

FOREIGN PATENTS OR APPLICATIONS

| | | | |
|---|---|---|---|
| 163,573 | 10/1905 | Germany | 182/155 |

*Primary Examiner*—Reinaldo P. Machado
*Attorney, Agent, or Firm*—William W. Haefliger

[57] ABSTRACT

A saw horse construction comprises:

a. a horizontally elongated work beam, and b. first and second support members for the beam, c. each support member comprising elongated tubing defining a transverse base and two legs extending upwardly from the base, the legs having upper and portions with pivotal connection to the work beam to accommodate pivoting of the support member relative to the beam and bringing the base into adjacency to the beam, and at least one leg of each support member having a releasable connection with the beam to block said pivoting and to retain the support member extending downwardly and longitudinally relative to the beam in beam supporting position.

1 Claim, 4 Drawing Figures

SAW HORSE

BACKGROUND OF THE INVENTION

This invention relates generally to construction equipment, and more particularly concerns a saw horse of unusually effective and simple design.

There is a continual need for low-cost, rugged and simple construction equipment, such as saw horses. No-one prior to the present invention, so far as I am aware, has provided a collapsible and stackable saw horse embodying folding supports of one-piece metallic tubular design, and embodying the advantages as referred to.

SUMMARY OF THE INVENTION

It is a major object of the invention to provide a saw horse in which the above features are found, and basically comprising:

a. horizontally elongated work beam, and b. first and second support members for the beam, c. each support member comprising elongated tubing defining a transverse base and two legs extending upwardly from the base, the legs having upper end portions with pivotal connection to the work beam to accommodate pivoting of the support member relative to the beam and bringing the base into adjacency to the beam, and at least one leg of each support member having a releasable connection with the beam to block said pivoting and to retain the support member extending downwardly and longitudinally relative to the beam in beam supporting position.

As will appear, the base and legs of each support have triangular construction, the support member comprising a single elongated metallic tube defining bends or folds between the base and legs; the tubular leg upper end portions may be flattened to guidably engage the opposite sides of the beam during pivoting; and pivotal and releasable connections may be defined by fasteners as will be described.

These and other objects and advantages of the invention, as well as the details of an illustrative embodiment, will be more fully understood from the following description and drawings, in which:

DRAWING DESCRIPTION

DETAILED DESCRIPTION

Figure 1:
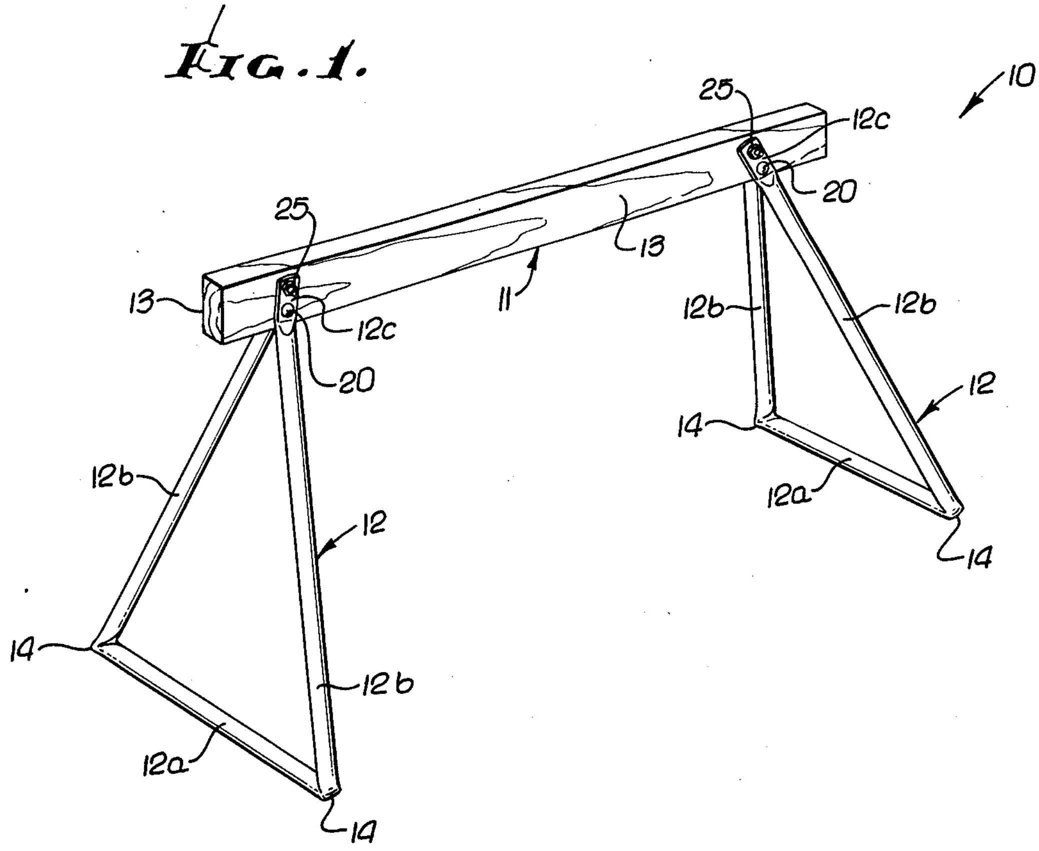
FIG. 1 is a perspective showing of a saw horse embodying the invention.
Figure 2:
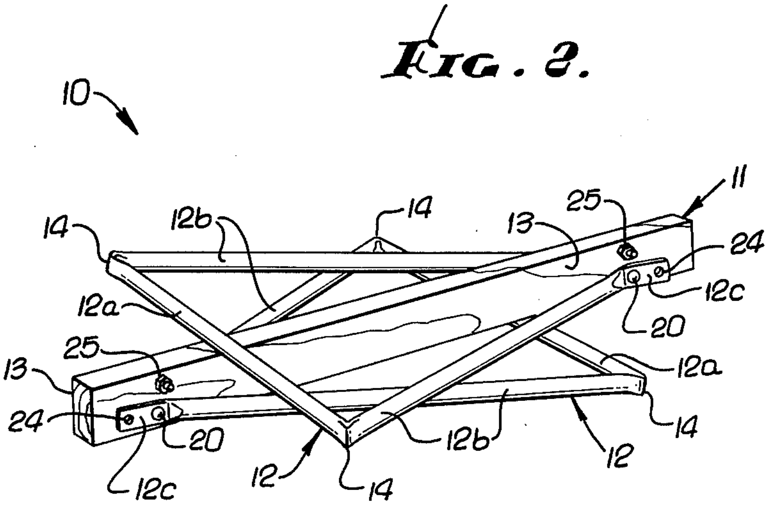
FIG. 2 is a perspective view showing the FIG. 1 saw horse in folded condition.
Figure 3:
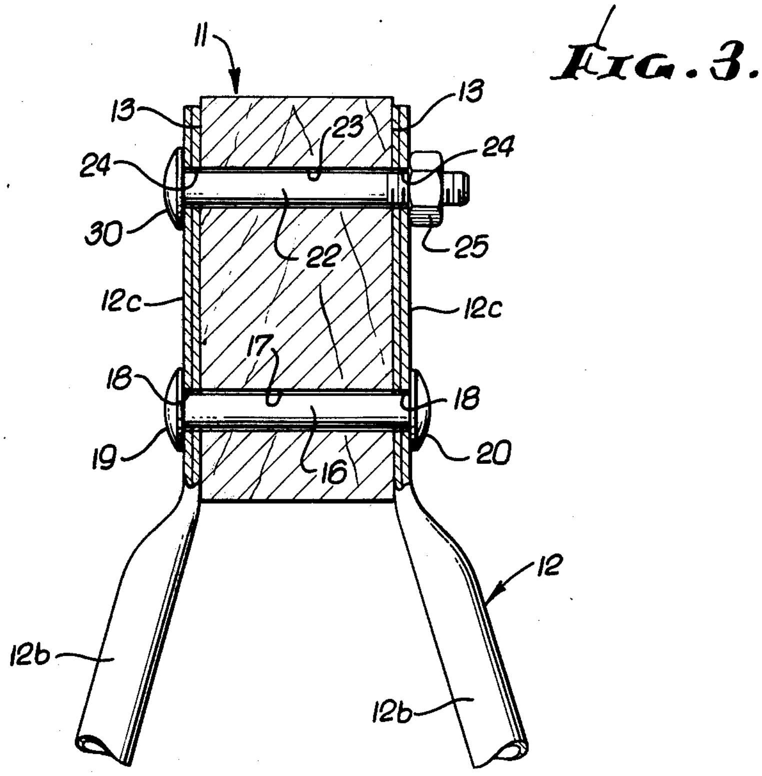
FIG. 3 is a cross section through a support member and bearing connection.

In FIGS. 1–3 the saw horse 10 is constructed to comprise a horizontal work beam 11 and first and second support members 12. The beam may consist of wood, and may typically have a 2 × 4 inches cross section, with flat opposite sides 13 extending in parallel vertical planes.

Each support member 12 comprises elongated metal tubing defining a transverse base 12*a* and two legs 12*b* extending upwardly from the base. The legs and base are interconnected by tubing bends or folds at 14 providing a rigid, one-piece, triangular construction of great strength, the legs 12*b* being of equal or substantially equal length.

The legs 12*b* also have upper end portions 12*c* which are flat to flatly engage the opposite sides 13 of the beam 11 and guide thereon during leg pivoting. End portion 12*c* may be formed by flattening the tubing upper terminals, as is clear from the drawings. Such upper end portions are pivotally connected to the work beam to accommodate pivoting of each support member 12 relative to the beam so as to bring the base 12*a* into adjacency to the beam, as is clear from FIG. 2. In that view, the bases 12*a* of the support members extend, respectively, closely above and below the beam. In FIG. 3, the pivoted connection typically includes a first fastener 16 extending transversely through a bore 17 in lower extent of the beam and through openings 18 in the leg upper end portions 12*c*. Heads 19 and 20 on the fastener retain the end portions 12*c* in sliding engagement with opposite sides of the beam.

In addition, at least one leg of each support member 12 has a releasable connection with the beam 11 to block pivoting of the support member, as described, and also to retain the support member extending downwardly and longitudinally relative to the beam in beam supporting position. In the FIG. 3 example, the releasable connection includes a second and endwise removable fastener 22 extending transversely through bore 23 in the beam and through bores 24 in the flattened upper terminals 12*c*, in spaced relation to the first fastener. Upon removal of the second fastener nut 25, that fastener is removable from the bores to free the support member for pivoting, as described. Fastener 22 also has a head at 30.

Figure 4:
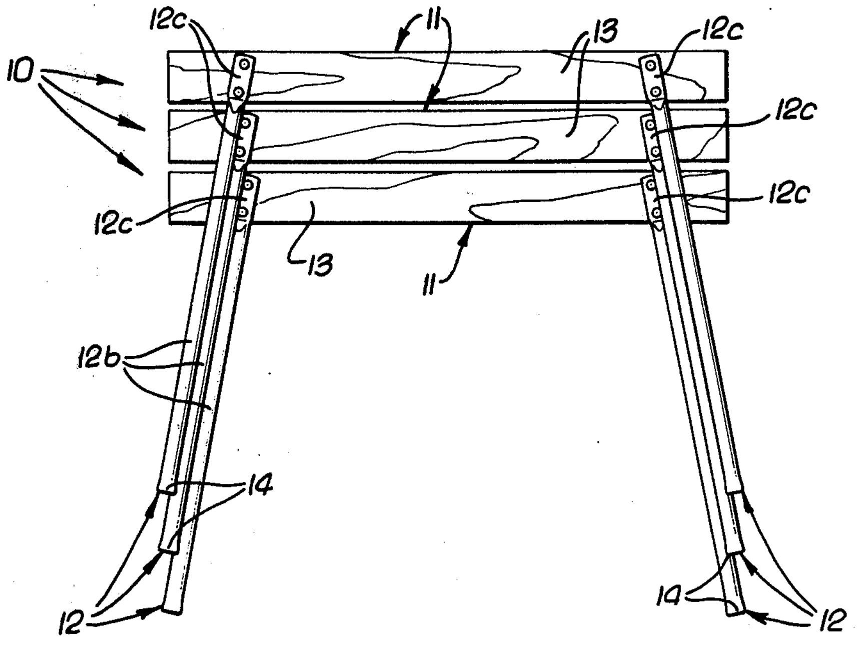
FIG. 4 is an elevation showing multiple of the FIG. 1 saw horses, in stacked condition.

FIG. 4 shows two FIG. 1 type saw horses stacked in nesting relation, with the downwardly and endwise oppositely flaring legs 12*b* of the upper horse engaging similar legs 12*b* of the lower horse.

I claim:

1. A saw horse construction comprising a. a horizontally elongated and relatively narrow work beam, and b. first and second like support members for the beam, c. each support member comprising elongated tubing defining a transverse base and two legs extending upwardly from the base, the legs having upper end portions with pivotal first connection to the work beam to accommodate pivoting of the support member relative to the beam and bringing the base into adjacency to the beam, d. said base and legs of each support member having triangular configuration, said support member comprising only a Δ shaped single and continuous elongated metallic tube defining folded bends between said base and legs, said leg upper end portions defined by flattened upper terminals of the tubing which engage and guide against the beam opposite sides during said pivoting, the support members having collapsed positions relative to the beam and in which their bases extend, respectively closely above and closely below the beam, said flattened upper end portions extending substantially entirely adjacent the beam sides in said collapsed positions of the support members, e. said leg flattened upper end portions of each support member also having releasable second connection with the beam to block said pivoting and to retain the support member extending downwardly and longitudinally relative to the beam in beam supporting position, each releasable second connection defined by a removable fastener extending transversely through the beam and through said flattened upper terminals and proximate the pivotal connection of the member to the beam, said second connection spaced from the first connection in the general direction of elongation of the associated leg, f. said first and second connections being the only connections of the legs to the beam.

* * * * *